Figure 1:
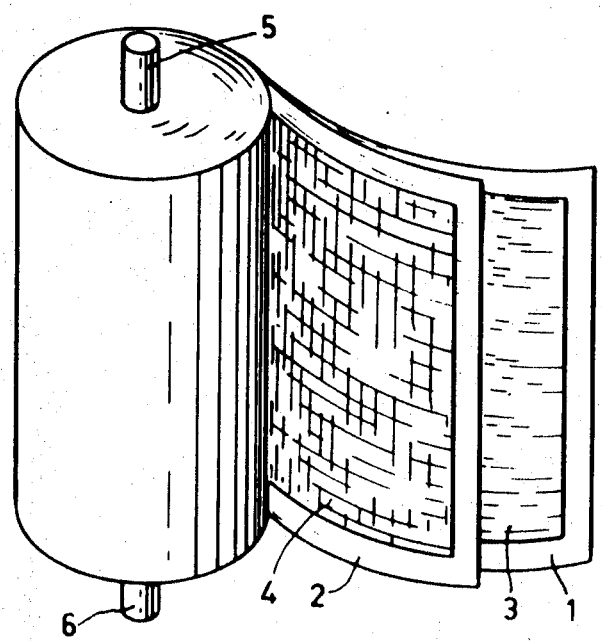
Figure 2:
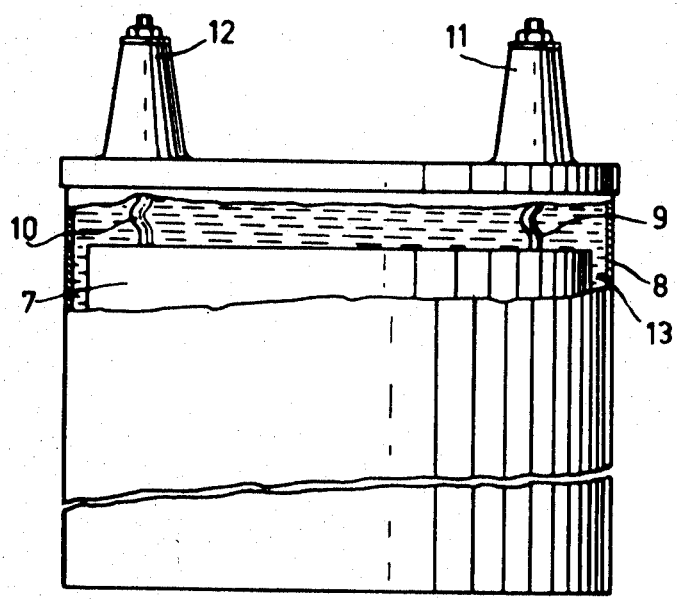

United States Patent

[11] 3,619,745

| [72] | Inventor | Michel Perigord |
| | | Joue Les Tours, France |
| [21] | Appl. No. | 864,538 |
| [22] | Filed | Oct. 7, 1969 |
| [45] | Patented | Nov. 9, 1971 |
| [73] | Assignee | U. S. Philips Corporation |
| | | New York, N.Y. |
| [32] | Priority | Oct. 10, 1968 |
| [33] | | France |
| [31] | | 169422 |

[54] CAPACITOR HAVING AN IMPREGNATED DIELECTRIC
2 Claims, 2 Drawing Figs.

[52] U.S. Cl. ............................................... 317/258, 252/64
[51] Int. Cl. ............................................... H01g 3/04
[50] Field of Search ...................................... 317/258, 259; 252/64

[56] References Cited
UNITED STATES PATENTS
3,424,957  1/1969  Katchman ..................  317/259

*Primary Examiner*—E. A. Goldberg
*Attorney*—Frank R. Trifari

ABSTRACT: A capacitor having a dielectric impregnated with a nonthermohardening epoxy resin.

INVENTOR.
MICHEL PERIGORD

CAPACITOR HAVING AN IMPREGNATED DIELECTRIC

This invention relates to a capacitor having an impregnated dielectric of the type obtained by winding or stacking alternately metal layers and dielectric layers and enclosed in an airtight casing.

In these capacitors the dielectric is formed by an insulating solid, porous cellulose material, for example, a wood paper sheet or plastic sheet, for example, the material termed Mylar or of a combination of these materials impregnated with an insulating, liquid material, which is in some cases ultimately solidified. Since this impregnation material has a dielectric constant or a relative permittivity higher than that of air initially contained in the pores of said dry solid material, the resultant permittivity is improved.

In order to estimate this improvement it may be supposed that a capacitor having a simple dielectric, for example, impregnated paper is formed by the series combination of two capacitances having the same electrode surfaces, one having a dielectric formed by the dry, solid porous insulator and the other having its dielectric formed by the impregnant. The resulting permittivity may then be expressed by the relation:

$$\epsilon = \frac{\epsilon_d \epsilon_i}{\epsilon_d \gamma + \epsilon_i (1-\gamma)} \quad (1)$$

$\epsilon_d$ being the permittivity of the porous solid material,
$\epsilon_i$ that of the impregnant, and
$-\gamma$ a filling or porosity coefficient defined by the ratio between the volume of the impregnant absorbed and the total volume.

The improvement in the resultant permittivity obtained by the impregnation permits of obtaining a corresponding increase in capacitance with the same of the capacitor, but the formula (1) shows that if an impregnant of gradually higher permittivity is chosen the gain in volume capacitance becomes gradually lower, while $\epsilon$ tends to reach a limit:

$$\epsilon_d/1-\gamma$$

which depends only upon the quality of the porous solid, when $\epsilon_i$ tends to reach a very high relative value. Therefore, although it is advantageous to improve the resultant permittivity, the effort to obtain an increase in capacitance by means of such an improvement becomes gradually less efficient and there is no sense in trying to attain very high values of relative permittivity.

The losses of a capacitor of simple dielectric, for example, of impregnated paper, defined by the loss angle tan δ may be expressed on the same consideration as that leading to the formula (1) as a function of the loss angle tans of said porous, dry, solid dielectric tan $\delta_d$ and of the impregnant tan $\delta_i$:

$$tg = \frac{tg\delta_d}{\left(1+\frac{\gamma}{1-\gamma}\cdot\frac{\epsilon_d}{\epsilon_i}\right)} + \frac{tg\delta_i}{\left(\frac{1+\gamma\epsilon_i}{\gamma\epsilon_d}\right)} \quad (2)$$

From this formula (2) it will be apparent that if the impregnant has a high relative permittivity $\epsilon_i$, the losses of the capacitor are primarily conditioned by the tan $\delta_d$ of said dry dielectric, whereas in the case of a low relative permittivity of the impregnant the loss angle tan $\delta_i$ becomes predominant. The choice of the impregnant has to be based on the consequences of the formulas (1) and (2), while the liquid chosen has to be the best combination of at least these two characteristics.

Among the impregnants employed so far, for example, mineral oils, waxes have a very low permittivity of the order of 2 and the capacitance increase obtained by the impregnation is very small.

The known synthetic oils such as the chlorodiphenyls have a higher permittivity, often of the order of 5 and acceptable loss angles, but they cannot be used for direct currents because of the electrolyzing effect of these oils and the arcing effect would release chlorine ions which may lead to the formation of hydrochloric acid which would soon attack the metal of the electrodes and of the connections and the dielectric so that the capacitor would be deteriorated.

These oils are also unserviceable in capacitors having metallized electrodes because the discharges during the regeneration of the dielectric would also release chlorine products. Moreover, these oils are highly polar and cannot be employed at all frequencies.

There have furthermore been used as impregnants thermohardening resins having various adjuvants, particularly hardeners and accelerators and polymerized after impregnation: the resultant dielectric is then a completely solid dielectric. However, in many cases a solid dielectric is not desired. In the case of high alternating voltage and of high-energy discharges some degree of viscosity is preferred, which may correspond to a maximum of 100,000 centipoise (cp.) at the ambient temperature.

A solid dielectric transfers to the electrodes the electrodynamic forces due to the periodicity and discharges, whereas the small thickness of these electrodes are particularly fragile.

Moreover, during the polymerization of the resin the contractions and the formation of gas bubbles involve the risk of gas ionization and the threshold voltage is reduced; on the contrary, with a liquid impregnant, which remains liquid, the developed gases are eliminated either by being drained or by being absorbed by the impregnant, while the threshold voltage is higher. Moreover, the phenomenon of dielectric hysteresis resulting in losses in alternating current at high frequencies is in general more likely to occur in a solid dielectric.

The viscosity of the impregnation agent must not be too low because too high a liquidity might result in the liquid being driven out of the porous impregnated solid by the pressure exerted by the discharges. A viscosity higher than 300 cp. at the ambient temperature is advantageous in most cases.

The thermohardening, polymerized resins hitherto used in solid dielectric capacitors do not satisfy all requirements mentioned above.

The invention has for its object to provide a capacitor having an impregnated, metallized or nonmetallized dielectric consisting of cellulosic material or plastic material, in which the impregnant provides an important increase in capacitance without thereby increasing the losses of the capacitor, the viscosity remaining advantageous in operation for alternating current and high voltage or in the case of high-energy discharges.

The invention is based on the conclusions which may be drawn from the formulas (1) and (2) and in order to obtain the most advantageous combination of characteristics it employs cast resins of the kind generally used as basic product to be mixed with an addition product for ultimate polymerization in a state in which the nonreticulated structure corresponds to an advantageous viscosity, in which the resins are thermoplastic and not thermohardening, while any hardener or polymerization accelerator as used generally or any other polymerization agent are omitted.

According to the invention a capacitor having a dielectric composed of one or more solid, insulating, materials impregnated by a liquid insulating product and is characterized in that said product is a nonreticulated epoxy resin in the nonthermohardening state without curing adjuvants, which resin remains free of any hardener or polymerization accelerator.

The term epoxy resin is to denote herein a cast ethoxy resin of a type commercially available under the generic name of epoxy, generally obtained by the condensation reaction of an epihalohydrine such as glycolepichlorohydrine with polyoxyhydride compounds such as diphenylolpropane. The structure of these resins has the following formula:

$$CH_2\!\!-\!\!CH\!\!-\!\!R\!\!-\!\![O\!\!-\!\!Ar\!\!-\!\!O\!\!-\!\!R\!\!-\!\!CH\!\!-\!\!CH_2]_n\!\!-\!\!O\!\!-$$

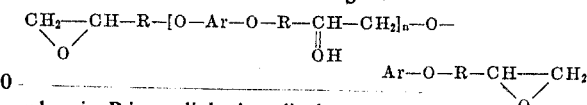

wherein: R is an aliphatic radical,
Ar is an aromatic group and
n is a factor-termed polymerization degree lying between 0 and 1.2,
in the case of the resins in accordance with the invention.

The term "epoxy resin" is to include also so-called cycloaliphatic epoxy resins, the epoxy functions of which have been obtained by oxidation of double bonds, for example, the commercial resin having the trade name "Araldite CY 179."

The permittivity of the epoxy resins employed in accordance with the invention is at least equal to 3 and lies preferably between 5 and 12; the epoxy equivalent is at the most equal to 300; the viscosity at the minimum operational temperature of the capacitor has to be lower than or equal to 600,000 c.p.s. and the viscosity at the maximum temperature of the impregnation treatment or of operation has to be lower than 100,000 c.p.s. The loss angle tan $\delta$ is lower than 0.02 and preferably lower than 0.01.

A capacitor whose paper dielectric is impregnated with a nonpolymerized epoxy resin in accordance with the invention has an advantageous set of characteristics: the resultant permittivity of the impregnated dielectric is much higher than that of the nonimpregnated dielectric and the increase in capacitance with a filling factor of the dielectric of 0.25 may attain more than 65 percent, whereas the increase would only be 12 percent with the same capacitor with mineral oil impregnation. At the same time the losses remain low, even at high frequencies.

In comparison with the same resins, but used in the conventional manner and polymerized subsequent to impregnation, the relative permittivity is higher and the threshold of ionization is much higher, for example 1,200 v. instead of 300 $V_{eff}$ at 50 Hz. with a capacitor comprising three dielectric layers of an average thickness of 10 $\mu$ each.

The viscosity at the operational temperature lies within a range suitable for use in discharges or alternating currents at high voltages.

The chemical stability of these resins is excellent and their oxidizing power is nil and most of their physical, chemical and electrical properties are at least as good as those of the known mineral of synthetic oils and especially their firing and flash points are better than those of mineral oils.

For example, a cast epoxy resin such as "Araldite" in the liquid state has a permittivity exceeding 8 to 20 at a frequency of 50 Hz. whereas the same resin has a permittivity of about 4 in the polymerized state.

These resins in the nonpolymerized state have in addition a loss angle tan $\delta$ of the order of $10^{12}$ and the viscosity lies in the optimum ranges both at the temperature of impregnation and at the temperature of operation.

Further advantages reside in the fact that these liquid resins do not release halogen ions, that their solidification temperature. may, if required, be considerably lower than that of synthetic oils and that their vapor tension is always very low.

As a matter of course, the hardening adjuvants usually added to the resins prior to the impregnation and not employed in accordance with the invention should not be replaced by a different polymerization agent of any kind. Moreover, maintaining the resin in its nonpolymerized state subsequent to impregnation requires protection of the impregnant against polymerizing agents such as humidity, solar radiation, radiations, excessive pressures or temperatures. These conditions are provided by the opaque, airtight casings of the conventional type used for capacitors having liquid impregnants, in which the dielectric is protected against the atmosphere and external radiations.

On the other hand the resins employed may be more or less complex, be modified or nonmodified, but the modification need not give rise to the occurrence of chlorine or involve the possibility of polymerization. For example, the resin may be modified by esterification; it may be mixed with a very small quantity of a different, but compatible resin.

These modifications or additions should, of course not result in values of viscosity or electrical properties beyond the above-mentioned limits.

As a matter of course the conditions of nonpolymerization and the limits of the characteristic properties mentioned above apply at least to the calculated lifetime of the capacitor.

The following description given by way of nonlimiting example will show how the invention may be carried into effect, the particularities resulting from said description forming of course part of said invention.

An electric capacitor may be formed by two dielectric sheets each coated with a conductive metal layer and wound by techniques usually employed in the manufacture of wound capacitors. Said dielectric consists of a solid, flexible, porous material, for example, cellulose paper and/or a product on synthetic resin basis, for example known under the trade name of Mylar. As a matter of course any dielectric material suitable for use in impregnated capacitors is appropriate for applying an impregnation in accordance with the invention. The said metal coating forming the electrode may have the form of a metal strip wound together with the dielectric strip or it may be formed by a metal deposition with the desired recesses. In the latter case the capacitor may have autoregeneration properties.

The metal of the electrodes is frequently aluminum, but other metals such as zinc or tin may be employed in accordance with the desired criteria. The use of the impregnation in accordance with the invention does neither impose any restriction on the thickness of the dielectric nor of the electrodes: for example, a paper of a thickness of 2 to 30 $\mu$m. may be employed with electrodes of a thickness up to 100 $\mu$.

The capacitor is wound and the connections are fastened thereto by conventional techniques. According to the invention the resultant coil is arranged in a casing and impregnated with a pure liquid resin free of any curing adjuvant so that its stability of viscosity with time, which only depends upon temperature, is ensured.

The impregnation is carried out with the precautions usually applied in these cases. The capacitor is previously dried in vacuo at a temperature equal to or higher than 100° C. Moreover, the impregnation resin is degassed also in vacuo at a temperature such that its vapor tension remains lower than the minimum pressure attained. This vapor pressure is particularly low so that the degree of degassing may be very high.

The impregnation is preferably carried out immediately without raising the pressure at a temperature depending upon the material concerned, mostly about 85° C.

The epoxy resins used for the impregnation in accordance with the invention may be commercially available basic products such as used with a view to their ultimate polymerization, but without the addition of any of the products usually added for the polymerization treatment. An example of an appropriate resin is the cast resin known under the trade name of "Araldite" F46, having the chemical formula

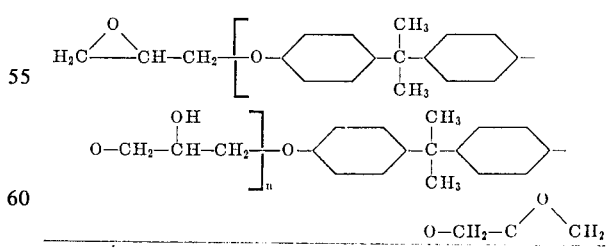

and an epoxy number of 215, which is solely subjected to the degassing treatment as mentioned above, while not any addition is made.

The resultant high-energy capacitors exhibit improved properties as compared with identical capacitors obtained by means of the known impregnation agents by the known techniques.

The following table shows by way of example measuring values for comparison relating to four high-voltage capacitors having a liquid impregnant, identical but for the impregnant and comprising a complex dielectric of paper and polyethylene teraphthalate, with aluminum electrodes of a thickness of 8$\mu$.

| Capacitor | Nr. 1 | Nr. 2 | Nr. 3 | Nr. 4 |
|---|---|---|---|---|
| Impregnant | Araldite F46, pure non-polymerised. | Diphenyl-chloride. | Mineral oil. | Polyisobutylene. |
| Capacitance in $\mu f$ | 13.8 | 13.8 | 12.1 | 12.2 |
| Gain by impregnation, percent. | 23 | 23 | 7 | 8 |
| Max. test voltage, v. | 7,000 | 5,000 | 5,000 | 5,000 |
| Loss angle tan $\delta/50$, Hz. | $35 \cdot 10^{-4}$ | $60 \cdot 10^{-4}$ | $25 \cdot 10^{-4}$ | $30 \cdot 10^{-4}$ |
| Time constant in mohms, $\mu f$. | 18,000 | 14,000 | 50,000 | 40,000 |

These dielectrics and electrodes are wound in coils and enclosed in an airtight casing. These capacitors have been subjected to charging and discharging tests in a resistance circuit of 1 Ω by series of shocks repeated with a frequency of 10 per minute at progressing voltages up to the maximum voltage withstood by each of them.

It will be seen that the capacitor No. 1, impregnated in accordance with a resin normally intended for polymerization but not being polymerized here, exhibits the most advantageous properties. The capacitance is high and at the same time the losses are low. This capacitor has allowed tests at a voltage higher than that of the other capacitors containing the known liquid impregnants.

A capacitor employing the impregnant of the invention is shown in the accompanying drawing. In this drawing, FIG. 1 shows a capacitor roll comprising two convolutely wound foils 1 and 2 having metal claddings 3 and 4. These metal claddings 3 and 4 are connected to metal leads 5 and 6 respectively. FIG. 11 in this drawing shows a capacitor roll 7 as shown in FIG. 1 enclosed in an airtight casing 8. Metal leads 9 and 10 are connected to terminal leads 11 and 12 respectively and between the capacitor roll 7 and the casing 8 a liquid impregnant 13, according to the invention, is present.

As a matter of course, modifications may be applied to the foregoing embodiments especially by using other equivalent technical means within the scope of the present invention.

What is claimed is:

1. An electrical capacitor consisting essentially of electrodes and a solid insulating dielectric positioned between said electrodes, said dielectric being impregnated with an insulating liquid impregnant consisting of a linear epoxy resin in the uncured state and free of polymerization agents.
2. A capacitor as claimed in claim 1 characterized in that
    a. the epoxy resin has a relative permittivity higher than 3. preferably between 5 and 12;
    b. the degree of polymerization of the resin lies between 0 and 1.2;
    c. the viscosity of the resin remains below 600,000 centipoises at the minimum operational temperature of the capacitor;
    d. the viscosity of the resin is lower than 100,000 centipoises at the maximum operational temperature;
    e. the capacitor is enclosed in an opaque, airtight casing.

* * * * *